(12) United States Patent
Mitchell et al.

(10) Patent No.: US 10,528,319 B2
(45) Date of Patent: Jan. 7, 2020

(54) AUDIO ASSOCIATION SYSTEMS AND METHODS

(71) Applicant: Hewlett-Packard Development Company, L.P., Houston, TX (US)

(72) Inventors: April Slayden Mitchell, San Jose, CA (US); Susie Wee, Palo Alto, CA (US); Mark C. Solomon, San Jose, CA (US); Glenn A. Wong, Redwood City, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 302 days.

(21) Appl. No.: 15/374,555

(22) Filed: Dec. 9, 2016

(65) Prior Publication Data

US 2017/0131971 A1    May 11, 2017

Related U.S. Application Data

(63) Continuation of application No. 13/983,247, filed as application No. PCT/US2011/027097 on Mar. 3, 2011.

(51) Int. Cl.
*G06F 3/16* (2006.01)
*H04N 7/15* (2006.01)
*G06F 3/0481* (2013.01)
*G10L 21/028* (2013.01)

(52) U.S. Cl.
CPC ............ *G06F 3/167* (2013.01); *G06F 3/0481* (2013.01); *G10L 21/028* (2013.01); *H04N 7/15* (2013.01)

(58) Field of Classification Search
USPC ...................................................... 348/14.08
See application file for complete search history.

(56) References Cited

U.S. PATENT DOCUMENTS

| 5,896,128 A | 4/1999 | Boyer |
| 6,621,502 B1 | 9/2003 | Nair et al. |
| 2004/0012565 A1 | 1/2004 | Cok |
| 2004/0230410 A1* | 11/2004 | Harless ................... G10L 15/26 703/6 |
| 2005/0280701 A1 | 12/2005 | Wardell |

(Continued)

FOREIGN PATENT DOCUMENTS

| CN | 1968363 A | 5/2007 |
| CN | 101867742 A | 10/2010 |

(Continued)

OTHER PUBLICATIONS

Candy, et al, Evaluating Software Support for Video Data Capture & Analysis in Collaborative Design Studies, Key Centre of Design Computing, Univ. of Sydney, 2006, NSW 10 pgs.

(Continued)

*Primary Examiner* — Amal S Zenati
(74) *Attorney, Agent, or Firm* — Brooks Cameron & Huebsch PLLC

(57) ABSTRACT

Audio capture systems and methods applicable to a large interactive device (LID) are provided. An audio capture method can include relating captured ambient audio provided by a first user with media presented to the first user via the LID. The method can also include indicating related media displayed on the LID based upon an audio input provided by the first user.

15 Claims, 6 Drawing Sheets

(56) References Cited

U.S. PATENT DOCUMENTS

| | | |
|---|---|---|
| 2006/0280312 A1 | 12/2006 | Mao |
| 2007/0160222 A1 | 7/2007 | Trepte |
| 2009/0015657 A1 | 1/2009 | Wong |
| 2009/0309846 A1* | 12/2009 | Trachtenberg .......... G06F 3/017 345/173 |
| 2010/0205190 A1* | 8/2010 | Morris ................... G06F 3/041 707/758 |
| 2010/0328306 A1 | 12/2010 | Chau et al. |
| 2011/0063191 A1* | 3/2011 | Leung .................. G06F 3/0481 345/1.1 |
| 2013/0272672 A1* | 10/2013 | Padro Rondon ....... G03B 31/04 386/201 |
| 2013/0318445 A1 | 11/2013 | Mitchell et al. |

FOREIGN PATENT DOCUMENTS

| | | |
|---|---|---|
| KR | 10-2009-0038413 A | 4/2009 |
| WO | 2012116464 | 9/2012 |

OTHER PUBLICATIONS

International Searching Authority, International Search Report, Nov. 16, 2011, PCT Application No. PCT/US2011/027097, dated Mar. 3, 2011, 8 pages.

* cited by examiner

AUDIO ASSOCIATION SYSTEMS AND METHODS

PRIORITY APPLICATION INFORMATION

This application is a Continuation of U.S. application Ser. No. 13/983,247, filed Aug. 1, 2013, which claims priority to and is a national stage application under 35 § USC 371 of International Application No. PCT/US2011/027097, filed Mar. 3, 2011, all of which are incorporated by reference in their entirety.

BACKGROUND OF THE INVENTION

Description of the Related Art

Large Interactive Devices (LIDs) provide an enhanced workspace for one or more individuals. A LID typically includes a display device such as a video display monitor or wall formed using a plurality of monitors. Interactive content displayed on the LID may include data input by one or more users (analogous to drawing on a whiteboard) or retrieved from a memory location coupled to the LID, either natively or remotely across a network. A typical use of a LID might be in a conference room environment where a group of users are collaborating on media displayed on the LID. While one individual may be responsible for the media displayed on the LID, all of the users may be discussing various aspects of the media.

BRIEF DESCRIPTION OF THE DRAWINGS

Advantages of one or more disclosed embodiments may become apparent upon reading the following detailed description and upon reference to the drawings in which.

DETAILED DESCRIPTION

Large Interactive Devices (LIDs) are finding greater acceptance in the marketplace. From displaying airport flight information to replacing conference room whiteboards, LIDs are replacing traditional "one way" data display devices. The media or data presented by the LID to the user or users of the LID can originate in one or more locations. For example, the data displayed on a LID used as a replacement for a conference room whiteboard might originate partially from the users of the LID, for example displaying a drawing of a new printer cartridge being designed by a group of users; and partially from a remote location, for example results of an internet search for competitive printer cartridges combined with an online video demonstrating the use of the competitive printer cartridge. Readily and simultaneously accessing internal and external knowledge on a single surface can enhance productivity.

The group of users can audibly evaluate not only their data input but also the data provided from remote locations via the LID. Transcription of the oral evaluation may interfere with the free flow of discussion since the pace of a conversation can frequently outstrip all but the quickest transcriptionist. Additionally, remote storage of oral evaluation fails to make use of the power of the LID, by relating the conversation to the displayed LID media.

Audio capture methods are therefore provided. An illustrative audio capture method can include relating captured ambient audio provided by a first user with media presented to the first user via the LID. The method can also include indicating related media displayed on the LID based upon an audio input provided by the first user.

Audio capture systems are also provided. An illustrative audio capture system can include a large interactive device ("LID") to provide media content to a first user and an audio capture device to capture ambient audio generated by the first user. The system can further include logic, which when executed by a processor coupled to the LID, relates the captured ambient audio provided by the first user with the media content provided to the first user. The system can also include a memory coupled to the LID to store at least a portion of the captured ambient audio and related LID media content and logic, which when executed by the processor coupled to the LID, indicates related media displayed on the LID based upon an audio input provided by the first user.

Additional audio capture methods are also provided. An illustrative audio capture method can include relating captured ambient audio provided by a plurality of users with media presented to the plurality of users via an LID. The method can further include storing the captured ambient audio and the related LID media content and indicating related media displayed on the LID based upon an audio input provided by any one of the plurality of users.

Figure 1:
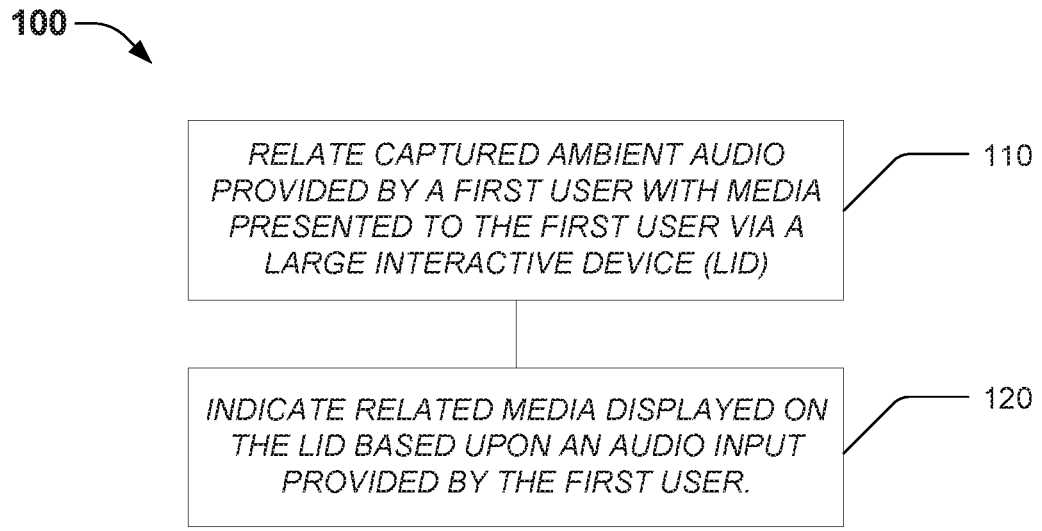
FIG. 1 is a flow diagram depicting an embodiment of an illustrative audio association method, according to one or more embodiments described herein.

FIG. 1 is a flow diagram depicting an embodiment of an illustrative audio association method 100, according to one or more embodiments. The method 100 can include relating captured ambient audio provide by a first user with media presented to the first user via a Large Interactive Device ("LID") at 110. The method can further include indicating at 120 related media displayed on the LID based upon the ambient audio input provided by the first user at 110. For example, if the first user was viewing an image of the HP TouchPad tablet on the LID and mentions that the HP TouchPad runs WebOS, the LID can automatically indicate any other instances of "HP," "TouchPad," or "WebOS" displayed elsewhere on the LID.

The method 100 can include relating captured ambient audio provided by a first user with media presented to the first user via a Large Interactive Device ("LID") at 110. The ambient audio supplied by the first user can be captured by the LID using any analog or digital audio capture device, for example a single microphone. In other embodiments, the analog or digital audio capture device can include a directional microphone, or a directional microphone array that permits the LID to capture the audio provided by the first user while providing a proximate location for the first user.

The ambient audio and the media presented to the first user can be related or otherwise associated, for example, by marking the ambient audio and the media with reference marks to synchronize the ambient audio with the media. In other embodiments, the ambient audio can be associated with at least a portion of the media presented to the first by transforming the ambient audio to text using a voice-to-text algorithm and temporally associating the text with the displayed media. In at least some embodiments, the converted ambient audio can be stored as a digital file by the LID. In some embodiments the ambient audio digital file can be searchable by the LID.

Other data may also be associated with the media presented via the LID, for example, the media metadata may also be associated with the ambient audio digital file thereby providing a reference to the subject matter of the media file. Using an illustrative example, the first user might be viewing an image of the HP TouchPad on the LID while describing various functional aspects of the device such as CPU, storage, and memory. Within the LID, an association can be formed between the various functional aspects described by the first user (as an ambient audio digital file), the media metadata, and the HP TouchPad media itself.

The method can further include indicating at 120 related media displayed on the LID based upon the ambient audio input provided by the first user at 110. In at least some embodiments, the LID can indicate related media content based upon the ambient audio input provided by the first user. In some embodiments, based upon the ambient audio supplied by the first user the LID can indicate related media content displayed elsewhere upon the LID. Continuing with the illustrative example above, in one embodiment, the LID might indicate all instances of media related to "HP Touch Pad" displayed on the LID when the first user provides an "HP TouchPad" ambient audio input.

The indication can include one or more visual signals, for example highlighting or otherwise isolating related media. The indication may include translation of the related media to a location proximate the first user—such a translation may be beneficial where the physical size of the LID makes it difficult for the first user to see the LID in its entirety. In some embodiments, the display of related media can include playback of the ambient audio associated with the identified related media.

Figure 2:
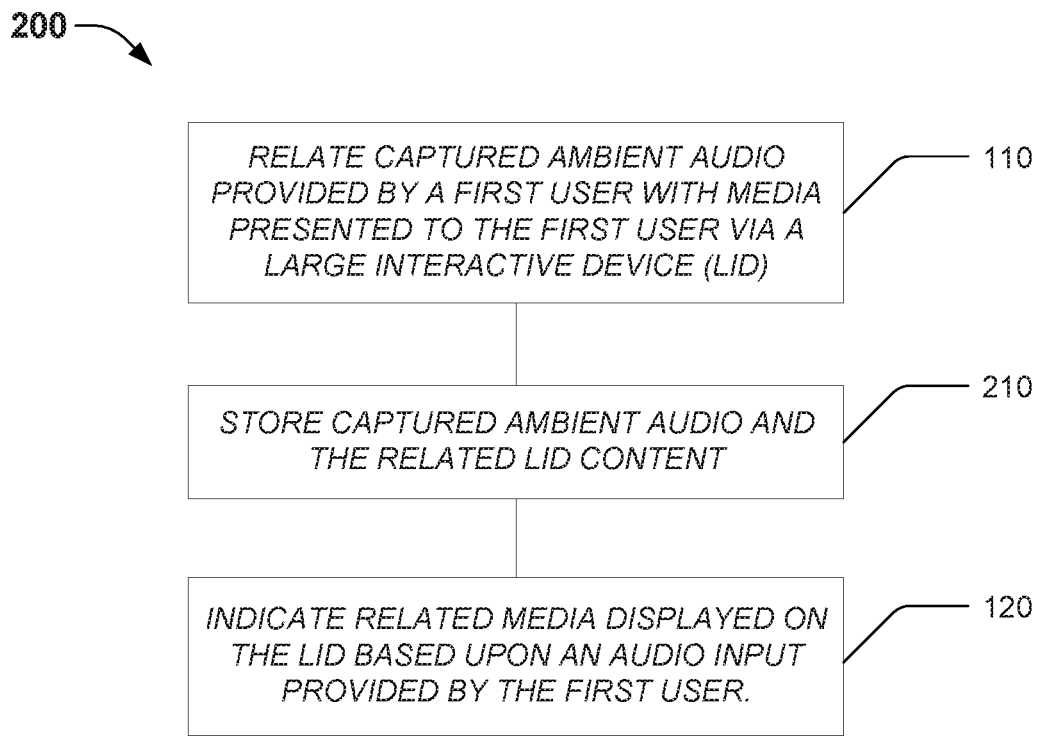
FIG. 2 is a flow diagram depicting an embodiment of another illustrative audio association method, according to one or more embodiments described herein.

FIG. 2 is a flow diagram depicting an embodiment of another illustrative audio association method 200, according to one or more embodiments. The captured ambient audio and related media content can be stored in a data storage or memory associated with the LID at 210.

In some embodiments, a data storage or memory can be associated with the LID, the data storage or memory can permit the storage of some or all of the ambient audio data provided by the first user to the LID. Additionally, in at least some embodiments, all or a portion of the media provided by the LID to the first user can be stored within the data storage or memory. Such storage makes it possible for the LID to indicate not just related media content currently displayed by the LID, but also related media content stored within the data storage or memory coupled to the LID. Continuing with the illustrative example described with reference to FIG. 1, in one embodiment, the LID could retrieve all instances of "HP TouchPad" both currently displayed on the LID (as described at 120) and all instances stored within the data storage or memory associated with the LID.

Figure 3:
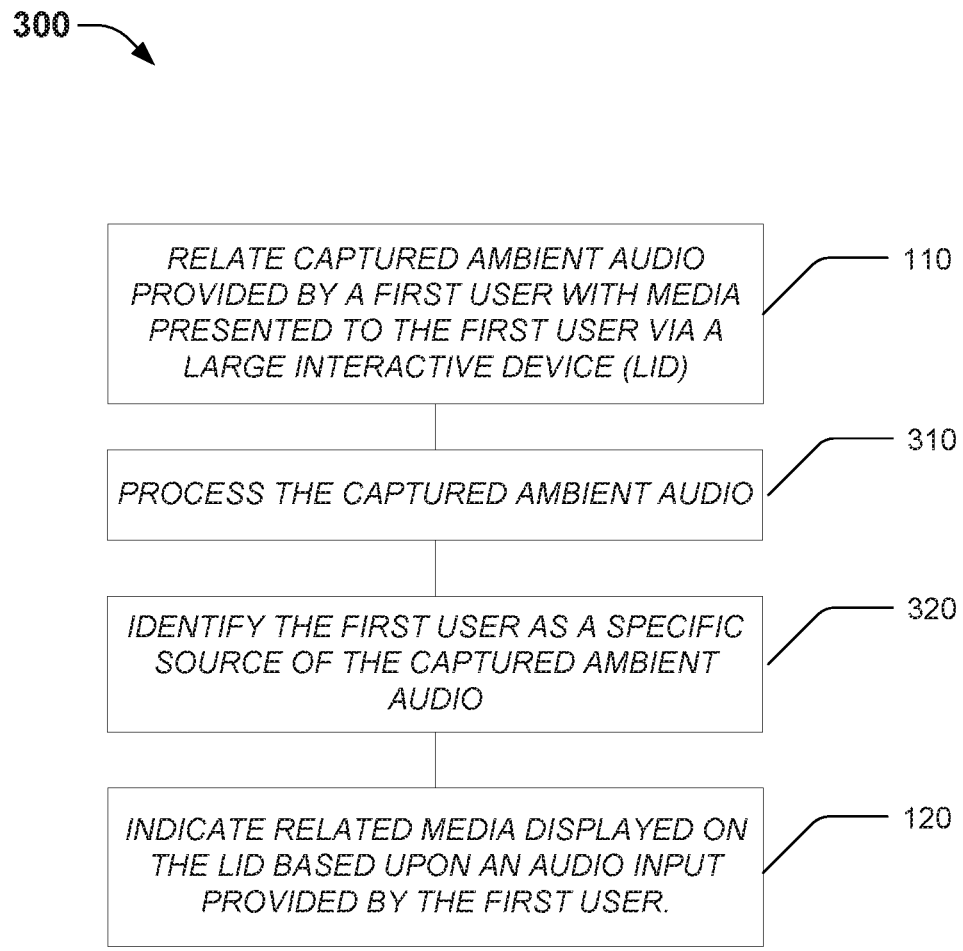
FIG. 3 is a flow diagram depicting an embodiment of yet another illustrative audio association method, according to one or more embodiments described herein.

FIG. 3 is a flow diagram depicting an embodiment of yet another illustrative audio association method 300, according to one or more embodiments. The LID can process the ambient audio provided by the first user at 310 to specifically identify the first user as the source of the captured ambient audio content at 320. The ability to associate ambient audio content with a specific user can permit further classification of the ambient audio data within the LID. For example, a user can specify that the LID indicate only related media associated with them or with another specific user identified by the LID.

Processing the captured ambient audio at 310 can include performing one or more algorithms on the captured ambient audio data. The one or more algorithms can include any type of audio or spatial processing of the ambient audio data. The processing performed at 710 can be analog, digital, or any combination thereof. The processing can be performed in whole or part using a processor within the LID, remote from the LID, or any combination thereof.

The specific identification of the first user as the source of the captured ambient audio content at 320 can be based upon processing the captured ambient audio at 310. The first user can be specifically identified based upon, in some embodiments, a speech identification algorithm sufficient to identify the first user. In other embodiments, the first user can be specifically identified based upon execution of an algorithm to determine the proximate location or position of the source of the ambient audio using one or more directional microphones or microphone array. In at least some embodiments, the source of the ambient audio data can be associated with the stored ambient audio within the LID.

Figure 4:
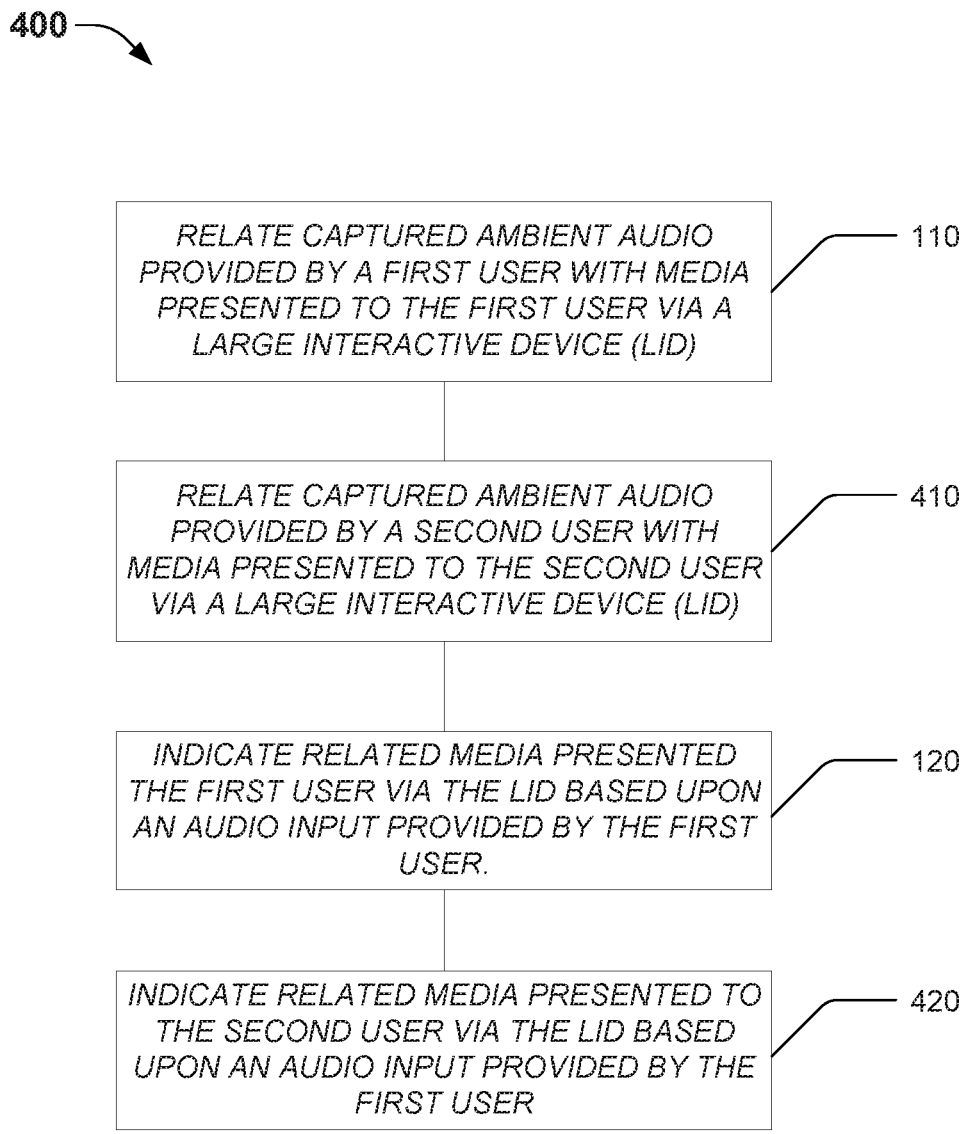
FIG. 4 is a flow diagram depicting an embodiment of still yet another illustrative audio association method, according to one or more embodiments described herein.

FIG. 4 is a flow diagram depicting an embodiment of still yet another illustrative audio association method 400, according to one or more embodiments. A first user and a second user can contemporaneously and independently supply ambient audio to the LID while the LID presents independent media to each user. The LID can relate captured ambient audio provided by the second user with media presented to the second user via the LID at 410 while relating captured ambient audio provided by the first user with media presented to the first user at 110.

By independently relating captured ambient audio supplied by both the first and second users with the media presented to each user, the LID can indicate all instances of related media, including media presented to other users of the LID at 420. For example, the LID can indicate related media presented to both a first user and a second user to the first user based upon the ambient audio input provided by the first user. Considering an illustrative example, if the first user and the second user each consumed media related to the HP TouchPad, and each provided an ambient audio input discussing one or more functional aspects of the TouchPad, when prompted by an ambient audio input, the LID can indicate related media supplied by both users to each of the users.

Figure 5:
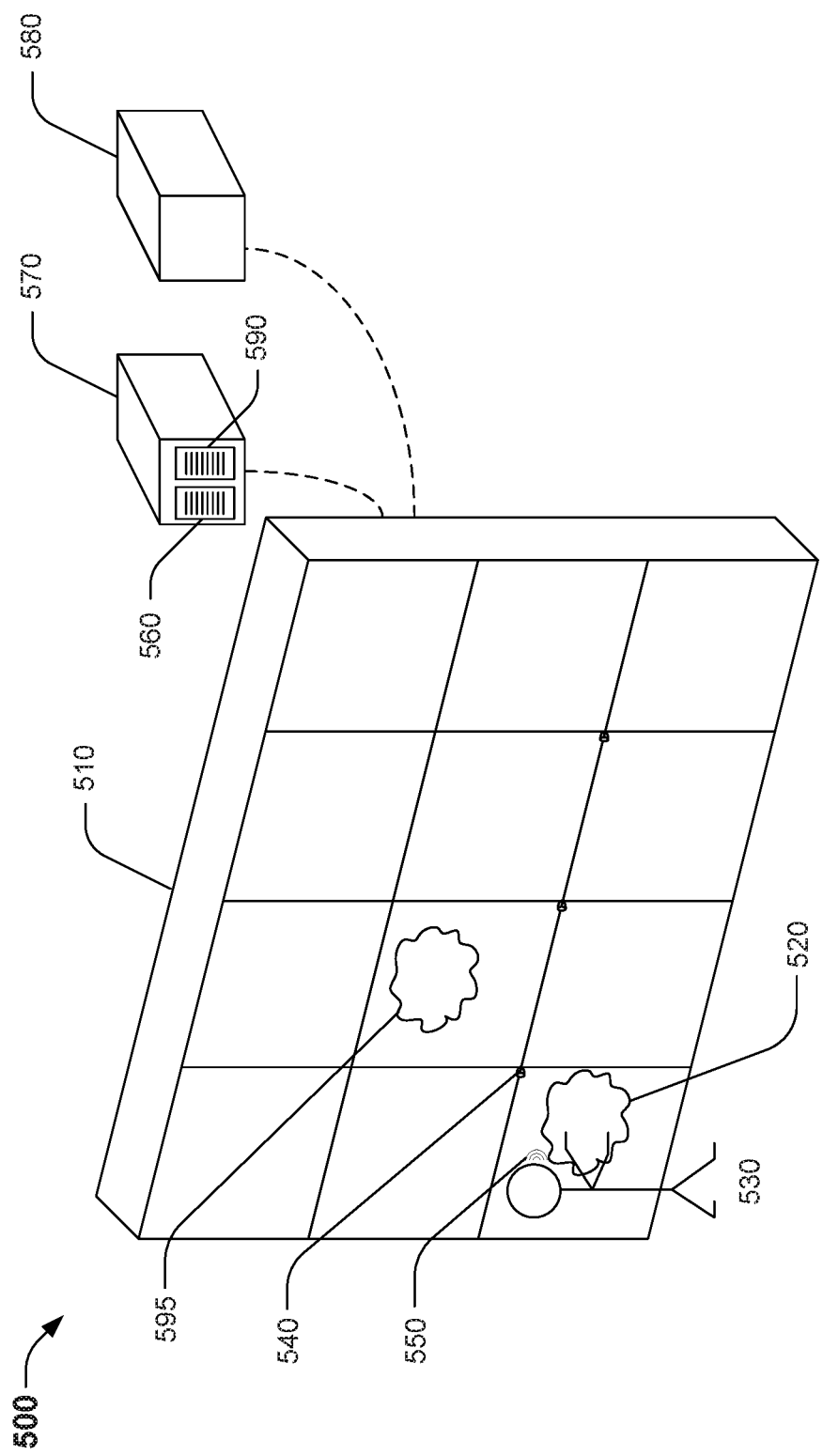
FIG. 5 is a schematic diagram depicting an embodiment of an illustrative audio association system, according to one or more embodiments described herein.

FIG. 5 is a schematic diagram depicting an embodiment of an illustrative audio association system 500, according to one or more embodiments. The system 500 can include a LID 510 configured to provide media content 520 to a first user 530. The system can further include an audio capture device 540 to capture ambient audio 550 generated by the first user. The system can also include logic 560, which when executed by a processor 570 coupled to the LID, relates the captured ambient audio provided by the first user with the media content provided to the first user. A memory 580 coupled to the LID can process and store at least a portion of the captured ambient audio and related LID media content. The system 500 can additionally include logic 590, which when executed by the processor coupled to the LID, indicates related media 595 displayed on the LID based upon an audio input provided by the first user.

The LID 510 can include any number of systems or devices, or any combination of systems and devices configured to provide media content 520 to at least the first user 530. In at least some embodiments, the LID 510 can include at least one touch sensitive device, such as a resistive or capacitive touch sensitive LCD panel. In at least some embodiments, the LID 510 can be a multi-user/multi-touch interactive device capable of independently supporting any number of users.

The LID 510 can include a plurality of devices or systems configured to provide multi-user touch capability, for example at least one non-touch sensitive LCD panel surrounded by a frame or bezel containing sensors configured to detect user touch gestures on the at least one non-touch sensitive LCD panel. In at least some embodiments, the LID 510 can include a plurality of non-touch sensitive LCD panels disposed in a regular grid or array on a rigid support structure surrounded by a frame or bezel containing sensors configured to detect user touch gestures from at least the first user 530.

The media content 520 supplied to the first user 530 can include any form of media content. In some embodiments, the media content 520 can include one-way communications, for example presenting images (e.g., JPEGs) or video (e.g., MPEGs) to the first user 530. In some embodiments, the media content 520 can include two-way communications, for example a videoconference between the first user 530 and a remote party. In at least some embodiments, some or all of the media content 520 can include metadata, for example metadata associated with the content, form, or format of the media.

The audio capture device 540 can include one or more audio input devices disposed in, on, about, or proximate to the LID 510 configured to capture at least a portion of the ambient audio 550 provided by the first user 530. In some embodiments, the audio capture device 540 can be a simple microphone providing only audio data to the processor 570. In some embodiments, the audio capture device 540 can be a single directional microphone providing audio data and audio source location data to the processor 570. In other embodiments, the audio capture device 540 can include a plurality of microphones providing audio data to the processor 560. In yet other embodiments, the audio capture device can include an array of microphones adapted to provide audio data and audio source location data to the processor 570.

The system 500 can also include logic 560 which when executed by the processor 570 creates a relationship between the ambient audio 550 supplied by the first user 530 with the media content 520 presented to the first user. In at least some embodiments, the ambient audio 550 can be converted to text prior to forming the association with the media content 520. In other embodiments, the association can be a conceptual, as opposed to literal, association—for example the logic 560 can associate the concept of a tablet computer rather than the HP TouchPad when the first user mentions "HP TouchPad" in their ambient audio 550.

The processor 570 can include any one or more devices configured to execute at least a portion of a machine-readable instruction set. The processor 570 can be disposed in, on, about, or proximate to the LID 510. The processor 570 can be disposed remote from the LID 510, for example a processor 570 disposed across a network. The processor can be a dedicated device or a shared device between other functions or multiple LIDs.

The memory 580 can be coupled to the processor 570 to the LID 510 or to both the processor 570 and the LID 510. The memory 580 can be disposed in, on, about, or proximate to the LID 510. The memory 580 can be disposed remote from the LID 510, for example a memory 580 disposed across a network, for example cloud based internet memory.

The system 500 can additionally include logic 590, which when executed by the processor 570 coupled to the LID 510, can indicate related media 595 displayed on the LID based upon an audio input provided by the first user. The logic 590 can include any logic capable of detecting associations between the ambient audio provided by the first user 530 and the media presented to the first user 530 by the LID 510. The association can be a keyword type association, a conceptual association, or any other form of associative capability suitable for detecting like or similar media content currently displayed by the LID, stored within the LID memory 580, or both displayed and stored by the LID.

Figure 6:
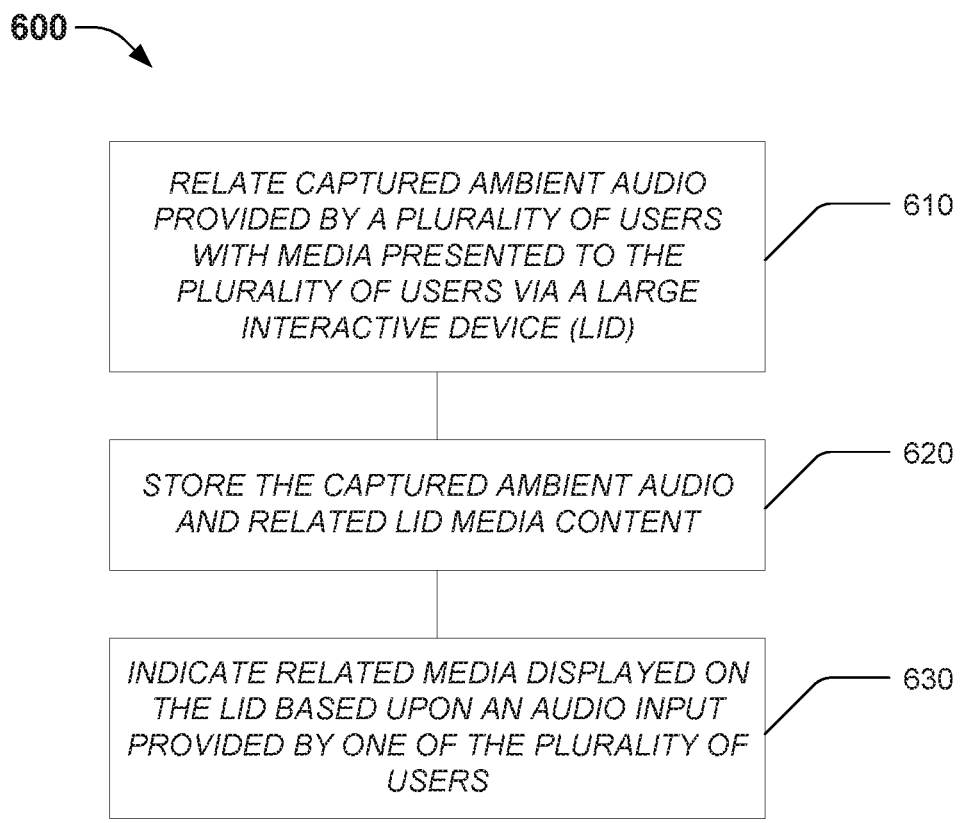
FIG. 6 is a flow diagram depicting an embodiment of another illustrative audio association method, according to one or more embodiments described herein.

FIG. 6 is a flow diagram depicting an embodiment of another illustrative audio association method 600, according to one or more embodiments. FIG. 6 provides, at least, a method for associating ambient audio provided by a plurality of users where the LID presents media to the plurality of users. An illustrative example might be a group of designers gathered before a LID discussing possible designs for a new laptop computer. As the LID displays various design options, the designers discuss and comment on each option, the comments, along with the media displaying the relevant design can be stored by the LID.

The method can include relating captured ambient audio provided by a plurality of users with media presented to the plurality of users via a LID at 610. The ambient audio from the plurality of users can be captured using one or more audio capture devices such as a conventional microphone, a directional microphone, an external microphone including microphones disposed in, on, or about an electronic device associated with the first user, or a microphone array. As the ambient audio provided by the plurality of users is captured, the audio can be associated with the media presented to some or all of the plurality of users via the LID. Such an association can be made, for example, by marking the ambient audio and the media with reference marks to synchronize the ambient audio with the media.

The ambient audio provided by the plurality of users can be related to the media presented to the plurality of users at 610, the resultant captured ambient audio and media content can be stored at 620. In some embodiments, the captured ambient audio can be combined with the media and stored as a single digital file. In other embodiments, the captured ambient audio and the media can be stored as separate digital files, each file having one or more reference marks to enable temporal synchronization of the digital ambient audio and media files. In yet other embodiments, the captured ambient audio can be stored as an analog file and the media can be stored as a digital file, each file having one or more reference marks to enable temporal synchronization of the analog ambient audio file and the digital media file.

The captured ambient audio and the media presented to the plurality of users can be stored either locally with the LID or remote from the LID. The captured ambient audio and the media presented to the plurality of users can be stored in a memory coupled to the LID. The captured ambient audio and the media presented to the plurality of users can be stored in a memory coupled to the LID over a network, for example "cloud" storage accessed via the internet.

In at least some embodiments, the captured ambient audio and the media presented to the plurality of users can be stored by the LID, and the media or an icon representing the media can remain displayed on the LID. Where the captured ambient audio and the media presented to the plurality of users is represented by the media itself or an icon remaining on the LID, some or all of the plurality of users can control the display of the media or icon, for example by recalling the media or deleting the media.

The method can also include relating related media displayed on the LID based upon an audio input provided by any one of the plurality of users at 630. Based upon the ambient audio provided by the plurality of users, the LID can indicate related content either displayed on the LID or stored within the memory of the LID. For example, where the plurality of users had been discussing a red laptop design, a blue laptop design, and a green laptop design multiple captured audio and media files may have been generated by the LID related to each design. A portion of the red, blue, and green audio and media files (e.g., most recently discussed) may be displayed on the LID, while another portion of the red, blue, and green audio and media files (e.g., older discussions) may be stored within a memory coupled to the LID. When the plurality of users requests information related to the "green laptop", the LID can respond by indicating those related files displayed on the screen, for example by highlighting those files. Additionally, in some embodiments, the LID can respond by retrieving those files related to the "green laptop" from the memory coupled to the LID. The ability to retrieve all related audio and media files can assist the plurality of users in more completely and comprehensively evaluating the "green laptop."

Figure 7:
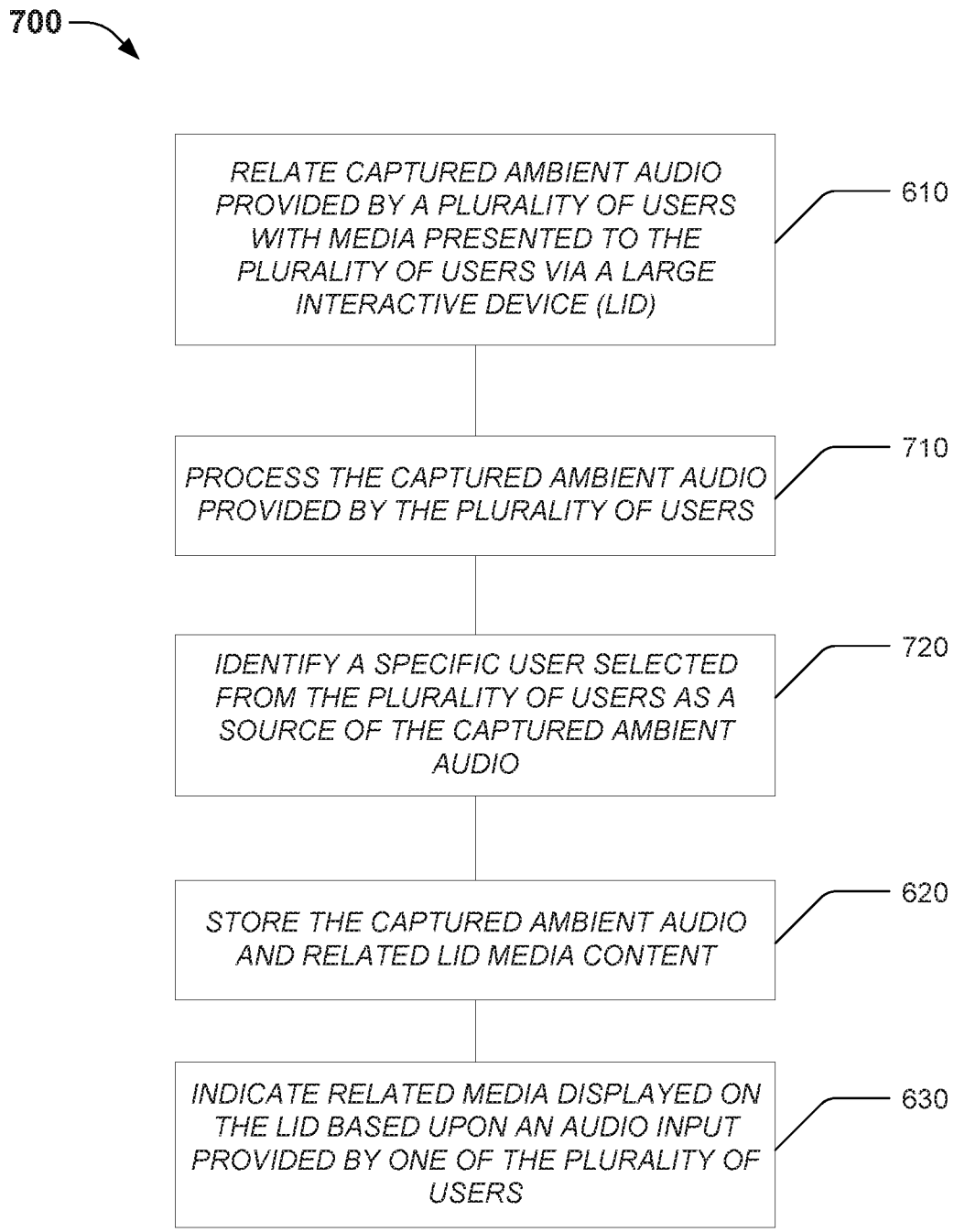
FIG. 7 is a flow diagram depicting an embodiment of yet another illustrative audio association method, according to one or more embodiments described herein.

FIG. 7 is a flow diagram depicting an embodiment of yet another illustrative audio association method 700, according to one or more embodiments. The method 700 can include processing at 710 the captured ambient audio provided by the plurality of users at 610. The method can further include identifying with specificity the individual source of the captured ambient audio content from the plurality users at 720. The ability to associate the ambient audio content with a specific user can permit further classification of the ambient audio data within the LID. For example, a user can specify that the LID indicate only related media associated with them or with another specific user identified by the LID.

Processing the captured ambient audio at 710 can include performing one or more algorithms on the captured ambient audio data. The one or more algorithms can include any type of audio or spatial processing of the captured ambient audio data. The processing performed at 710 can be analog, digital, or any combination thereof. The processing can be performed in whole or part using a processor within the LID, remote from the LID, or any combination thereof.

The identification of a specific user selected from the plurality of users as the source of the captured ambient audio content at 720 can be based upon the processed captured ambient audio at 710. The specific user selected from the plurality of users can be identified based upon, in some embodiments, an identification algorithm, for example a speech recognition algorithm, sufficient to particularly identify the user. In other embodiments, the specific user selected from the plurality of users can be identified based upon execution of an algorithm to determine the proximate location or position of the source of the ambient audio using one or more directional microphones or a microphone array. In at least some embodiments, the source of the ambient audio data can be associated with the stored ambient audio within the LID.

The ability to associate a specific user with the captured ambient audio and media can permit even greater flexibility in selecting and indicating relevant related media. For example, where the plurality of users consists of users 1, 2, and 3, and the plurality of users is discussing a red laptop design, a blue laptop design, and a green laptop design, the ability to associate a specific user with a given captured ambient audio and media file may permit the indication of captured ambient audio and media files related to the "blue laptop" provided by user 1, but not by users 2 and 3.

While the foregoing is directed to embodiments of the present invention, other and further embodiments of the invention may be devised without departing from the basic scope thereof, and the scope thereof is determined by the claims that follow.

What is claimed is:

1. An audio capture method for a large interactive device (LID), comprising:
   capturing a first audio input provided by a first user related with a first media content presented to the first user via the LID;
   detecting associations between the first audio input provided by the first user and a second media content, related to content of the first media, by accessing remote resources;
   synchronizing the first audio input provided by the first user, the first media content, and the second media content by:
      marking the first audio input with a reference mark;
      marking the first media content with the reference mark; and
      marking the second media content with the reference mark;
   indicating the second media content displayed elsewhere upon the LID based upon the synchronization of the first audio input, the first media content, and the second media content; and
   moving the indicated second media content to a location upon the LID proximate the first user.

2. The method of claim 1, further comprising:
   determining a proximate location for the first user with respect to the LID in response to capturing the first audio input provided by the first user; and
   moving the second media content to the proximate location for the first user with respect to the LID.

3. The method of claim 1, further comprising storing the captured first audio input and the second media content.

4. The method of claim 1, further comprising:
   processing the captured first audio input; and
   identifying the first user as a specific source of the captured first audio input.

5. The method of claim 1, further comprising:
   capturing a second audio input provided by a second user with a third media content presented to the second user via the LID; and
   indicating the third media content presented to the second user via the LID based upon the first audio input provided by the first user.

6. The method of claim 1, wherein indicating the first and the second media content comprises altering visible media parameters.

7. The method of claim 4, wherein indicating the third media content presented to the second user comprises altering visible media parameters.

8. The method of claim 1, wherein:
the first and the second media content presented to the first user via the LID changes with time; and
the captured first audio input provided by the first user is temporally linked to the first media content.

9. The method of claim 1, wherein detecting the associations comprises detecting a keyword type association or a conceptual association.

10. The method of claim 9, wherein detecting the keyword type association comprises:
converting the first audio input provided by the first user to text; and
associating the text with the second media content displayed elsewhere upon the LID.

11. An audio capture system comprising:
a large interactive device (LID) to provide a first media content to a first user, wherein the LID comprises a plurality of touch sensitive display devices;
a processor;
a directional audio capture device to capture a first audio input provided by the first user;
a memory storing instructions that, when executed by the processor, cause the processor to:
determine a proximate location for the first user with respect to the LID upon capturing the first audio input via the directional audio capture device;
relate the captured first audio input provided by the first user with the first media content provided to the first user;
detect associations between the first audio input provided by the first user and a second media content, related to the content of the first media, currently displayed elsewhere upon the LID;
synchronize the first audio input provided by the first user, the first media content, and the second media content by:
marking the first audio input with a reference mark;
marking the first media content with the reference mark; and
marking the second media content with the reference mark;
move the second media content displayed elsewhere upon the LID, based upon the synchronization of first the audio input provided by the first user, the first media content, and the second media content to a location upon the LID proximate the first user, wherein the movement of the second media content corresponds to the proximate location for the first user with respect to the LID; and
store at least a portion of the captured first audio input and the second media content in the memory.

12. The system of claim 11, further comprising instructions to cause the processor to:
capture a second audio input provided by a second user related with a third media content presented to the second user via the LID; and
indicate third media content presented to the second user via the LID based upon an audio input provided by the first user.

13. A non-transitory computer-readable medium, containing instructions executable by a processor to cause the processor to:
capture an audio input provided by a first user;
determine a proximate location for the first user with respect to a large interactive device (LID) in response to capturing the audio input;
relate the captured audio input provided by the first user with a first media content provided to the first user;
detect associations between the audio input provided by the first user and a second media content, related to content of the first media by accessing remote resources; and
synchronize the audio input provide by the first user, the first media content, and the second media content by:
marking the audio input with a reference mark;
marking the first media content with the reference mark; and
marking the second media content with the reference mark.

14. The non-transitory computer-readable medium of claim 13, further comprising instructions to cause the processor to associate at least a portion of the captured audio input with the first user.

15. The non-transitory computer-readable medium of claim 13, further comprising instructions to cause the processor to temporally relate the captured audio input provided by the first user with time dependent and changing media content.

* * * * *